US008469423B1

(12) United States Patent
Crowley, Jr. et al.

(10) Patent No.: US 8,469,423 B1
(45) Date of Patent: Jun. 25, 2013

(54) TELESCOPIC HOT STICK WITH CONTROLLED BUTTON MOVEMENT FEATURE

(75) Inventors: Daniel J. Crowley, Jr., Delton, MI (US); Gary L. James, Middleville, MI (US); Mark A. Schmidt, Hastings, MI (US)

(73) Assignee: Hastings Fiber Glass Products, Inc., Hastings, MI (US)

( * ) Notice: Subject to any disclaimer, the term of this patent is extended or adjusted under 35 U.S.C. 154(b) by 12 days.

(21) Appl. No.: 13/356,958

(22) Filed: Jan. 24, 2012

(51) Int. Cl.
*B25J 1/00* (2006.01)
*F16B 7/10* (2006.01)

(52) U.S. Cl.
USPC ......... 294/174; 294/210; 403/109.3; 403/328

(58) Field of Classification Search
USPC ............... 294/174, 210; 403/109.3, 109.8, 403/328, 379.5; 81/53.1, 53.11, 53.12
See application file for complete search history.

(56) References Cited

U.S. PATENT DOCUMENTS

| | | | |
|---|---|---|---|
| 1,033,187 A | 7/1912 | Metzger | |
| 1,365,851 A | 1/1921 | Reynolds | |
| 2,291,593 A * | 7/1942 | Hubbard | 294/174 |
| 2,319,992 A * | 5/1943 | Hubbard | 294/174 |
| 2,980,456 A | 4/1961 | McMullin | |
| 3,347,575 A | 10/1967 | Morris | |
| 4,056,115 A | 11/1977 | Thomas | |
| 4,079,978 A * | 3/1978 | McMullin | 294/174 |
| 4,616,668 A | 10/1986 | Battiston | |
| 5,255,993 A | 10/1993 | Kovacs | |
| 5,315,795 A | 5/1994 | Chae et al. | |
| 5,593,196 A | 1/1997 | Baum et al. | |
| 5,961,387 A | 10/1999 | Parsons | |
| 6,079,894 A * | 6/2000 | Obitts | 403/109.3 |
| 6,097,894 A | 8/2000 | Suda | |
| 6,213,672 B1 | 4/2001 | Varga | |
| 6,749,227 B2 | 6/2004 | Margid | |
| 6,925,686 B2 | 8/2005 | Heathcock et al. | |
| 2011/0121546 A1 | 5/2011 | Stewart | |
| 2011/0123258 A1 * | 5/2011 | Braun et al. | 403/109.3 |

* cited by examiner

*Primary Examiner* — Dean Kramer
(74) *Attorney, Agent, or Firm* — Flynn, Thiel, Boutell & Tanis, P.C.

(57) ABSTRACT

A multi-section telescoping pole for manipulating a tool. Sections of the pole have apertures. A pinch safety locking assembly includes a button configured for movement by a digit on a user's hand to a first position by a first resilient member when received in aligned first and second apertures to restrain the second section from moving relative to the first section and to a second position against a resistance provided by the first resilient member and against an elastic stop to permit relative longitudinal movement between the first and second sections. The pinch safety locking assembly is additionally configured to facilitate assembly by movement of the button by use of an excessive force to a third position against a combined resistance of the first resilient member and the elastic stop to permit relative movement between the pinch safety locking assembly and the second section.

6 Claims, 3 Drawing Sheets

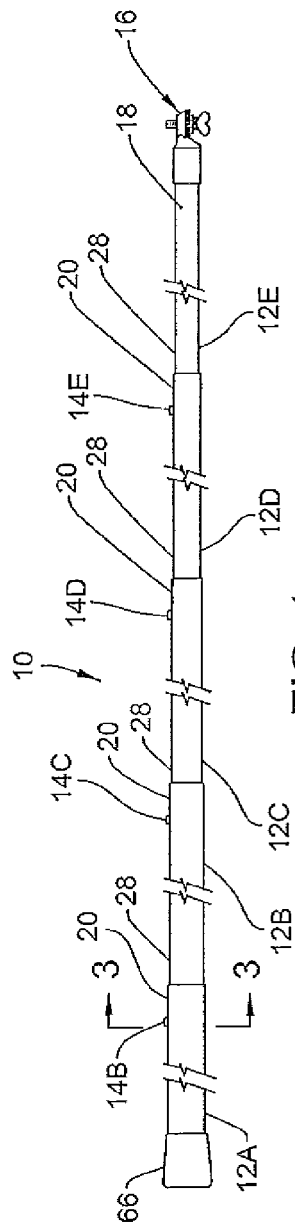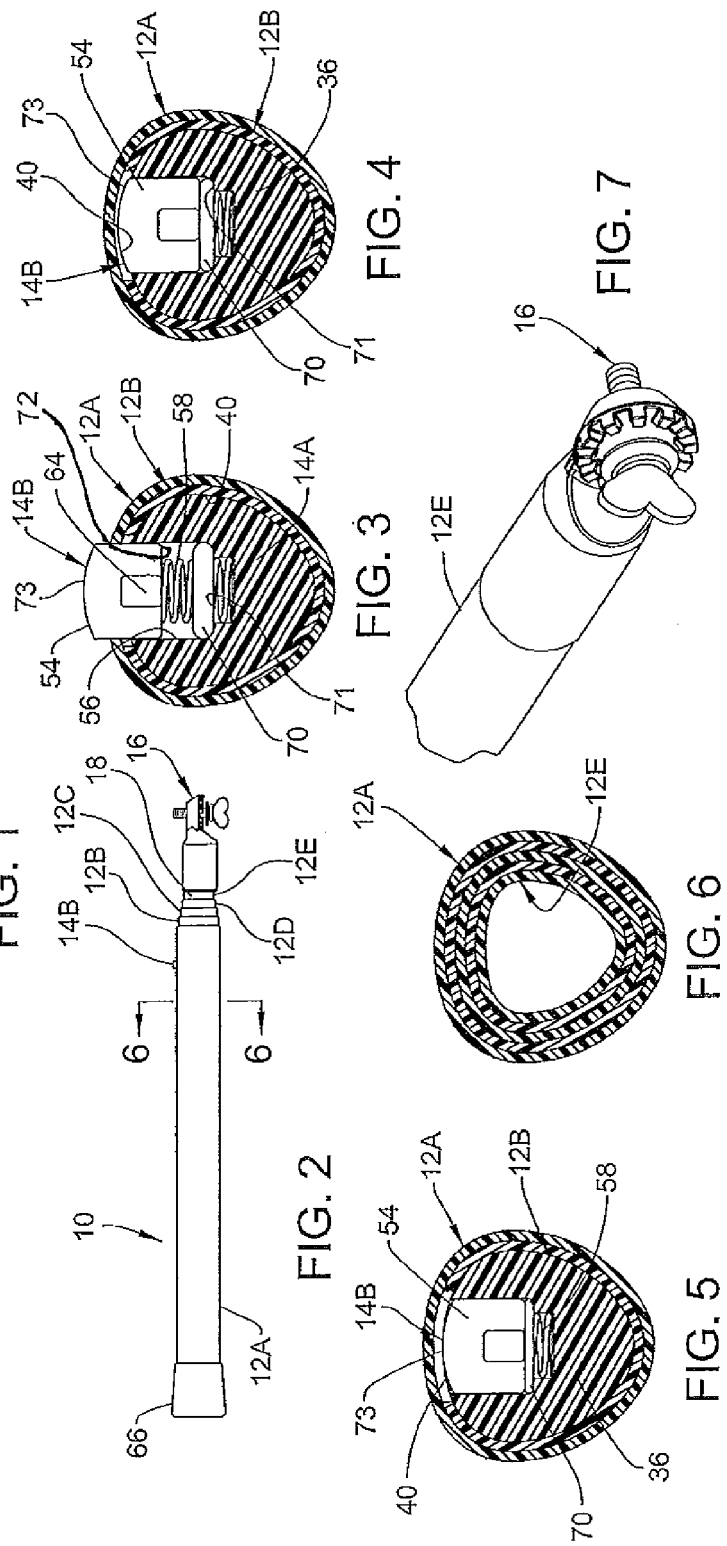

TELESCOPIC HOT STICK WITH CONTROLLED BUTTON MOVEMENT FEATURE

FIELD OF THE INVENTION

The invention relates to an improvement to the general type of hot stick device, a representative example of which is disclosed in U.S. Pat. No. 5,593,196, namely, a multi-section telescopic pole for manipulating a tool from a position a selected distance away from a workpiece and, more particularly, to a releasable section locking assembly which includes a pinch safety feature.

BACKGROUND OF THE INVENTION

Telescopic hot sticks are typically used in a high voltage electrical environment as well as other environments where a long reach is needed to access a workpiece located at a remote location, such as on a power pole or the like. Hot sticks are typically constructed of a suitable dielectric material and include a tool holder at an extremity thereof. The tool holder is adaptable to engage a wide array of different tools or the like. One such hot stick is disclosed in U.S. Pat. No. 5,593, 196, the entirety of the disclosure in this patent being incorporated herein by reference.

The hot stick disclosed in U.S. Pat. No. 5,593,196 allows a user to perform a wide variety of tasks such as opening and closing various types of switches, replacing fuses, pruning tree limbs or replacing lamps in street circuits and rooms with high ceilings. Since the workpiece may be as far as 30 feet or more away from a user, the telescoping hot stick or pole provide a variable length to accommodate these tasks.

One of the issues that arises when the user wishes to extend or collapse the pole sections is that when a digit on the user's hand is used to depress a button on the locking assembly into the button receiving aperture to move the top surface of the button to a location inside of the inner surface of the outer pole section, sometimes the digit moves the top surface of the button to a position below the outer surface of the inner pole section resulting in the digit on the user's hand becoming pinched between the outer surface of the inner pole section and the inner surface of the outer pole section. When the user's hand is covered by a glove, the material of the glove can become caught in the pinch zone.

Accordingly, it is a purpose of this invention to provide a telescoping pole assembly which includes a pole locking assembly having a pinch safety feature for preventing the digit on the user's hand or the material of the user's glove from becoming pinched between to two mutually adjacent telescoped poles.

It is a further object of the invention to provide a telescoping pole assembly wherein the pinch safety feature allows the top surface of the button to be moved from a location radially outside the outer pole section inwardly through the button receiving aperture to a location just inside the inner surface of the outer pole section against a resistance provided by a first elastically yieldable member and against a resiliently yieldable stop. Continued movement of the button radially inwardly can only be continued by the use of a tool or an excessive hand force. This continued movement is against the resistance provided by the first elastically yieldable member combined with the resistance provided by the yieldable stop in the form of a second elastically yieldable member is important for initial assembly purposes to allow a radially inward movement of the top surface of the button to a location radially inside of the inner surface of the inner pole section to enable the locking assembly to be initially inserted into the interior of the inner pole section.

SUMMARY OF THE INVENTION

The objects and purposes of the invention have been met by providing a multi-section telescoping pole for manipulating a tool from a position a selected distance away from a workpiece and including a tubular first section having a female end and a predetermined shape, the first section having a first aperture and an interior which defines an axial path and has an interior surface which is uniform about a periphery thereof. A second section has a male end slidably engaged within the interior of the first section through the female end and having a second aperture and a predetermined shape corresponding to the shape of the first section and being slidable along the axial path. A pinch safety locking assembly includes a button configured for manual movement of the button by a digit on the user's hand within aligned first and second apertures from a first position radially outside the outer periphery of the first section radially inwardly against a resistance provided by a first resilient member so that a top surface of the button becomes located at a second location just inside the inner surface of the first section whereat an end of the button remote from the top surface engages an elastically compressible stop having a high compression resistance characteristic to permit relative longitudinal movement between the first and second sections without the digit on the user's hand becoming pinched. The pinch safety locking assembly is additionally configured to facilitate initial assembly by movement of the top surface of the button by the use of a tool or excessive hand force to a third position just inside the inner surface of the second section against a combined resistance of the first resilient member and the resistance of the elastically compressible stop to permit relative movement between the pinch safety locking assembly and the second section and a sliding of the pinch safety locking assembly along said axial path to a position where the button is aligned with and received in the second aperture.

BRIEF DESCRIPTION OF THE DRAWINGS

FIG. 1 is a broken front elevational view of the telescoping hot stick of the invention illustrated in the fully extended position;

FIG. 2 is a broken front elevational view of the telescoping hot stick illustrating a plurality of sections collapsed one within the other;

FIG. 3 is a sectional view of cooperating male and female ends of adjacent sections and of a locking assembly illustrated in engagement as viewed in the direction of arrows 3-3 of FIG. 1;

FIG. 4 is a sectional view similar to FIG. 3 but with the button of the locking assembly pushed further radially inwardly so that the top surface of the button is located radially inside of the inner surface of the outer tube section;

FIG. 5 is a sectional view similar to FIG. 4 but with the button of the locking assembly pushed further radially inwardly so that the top surface of the button is located radially inside of the inner surface of the inner tube section;

FIG. 6 is a sectional view of the sections collapsed one within the other as viewed in the direction of arrows 6-6 of FIG. 2;

FIG. 7 is a partial perspective view of an extremity of the telescoping hot stick illustrating a tool holder;

DETAILED DESCRIPTION

Figure 8:
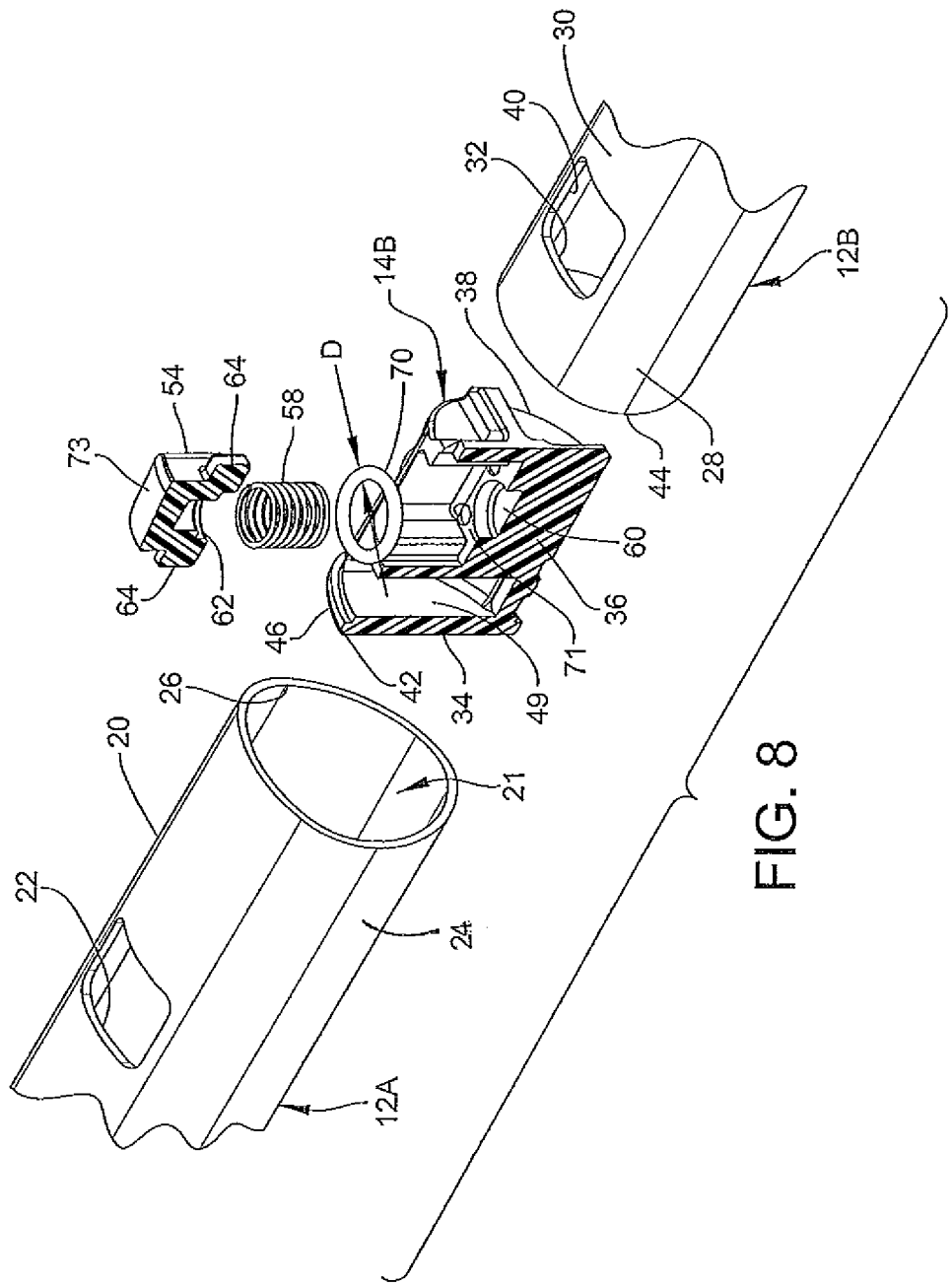
FIG. 8 is an exploded partial perspective view of the male and female ends of adjacent sections and an exploded sectional view of a locking assembly therebetween.

Referring to FIG. 1, the telescopic hot stick or pole of the invention is generally designated by reference numeral 10. The telescoping hot stick 10 includes a predetermined number of similar length, tubular sections 12, i.e. 12A-12E, slidingly engaged one with the other which provide a variable length for the hot stick 10, a corresponding number of locking assemblies 14, i.e. 14B-14E, provided between each adjacent section 12 for securing the adjacent sections 12 in extended engagement, and a tool holder 16 at an extremity 18 thereof. To shorten the overall length of the hot stick 10, each section 12 is readily removable as described herein.

More particularly, to provide telescoping engagement of the sections 12A-12E, the sections 12A-12E are provided with progressively decreasing cross-sectional dimensions as illustrated in FIG. 6 wherein the first section 12A has the largest cross-sectional dimension and last section 12E has the smallest cross-sectional dimension. The sections 12 are tubular and have a close-fit slidingly engaged relation one with the other so that the sections will remain coaxial with little or no detectable relative movement therebetween when in the extended relation.

To prevent relative rotation between the sections 12, sections 12 are formed with a predetermined non-circular cross-sectional shape. Preferably, this shape is substantially triangular as illustrated in FIG. 6 so as to have three side surfaces with a convex arcuate corner portion disposed between each mutually adjacent pair of side surfaces. It should be recognized that other non-circular shapes may be used, so long as rotation of one section 12 relative to an adjacent section 12 is prevented and sliding engagement is permitted.

The cross-sectional shape should be uniform along the axial length of each section 12 to facilitate assembly and disassembly of the hot stick 10. In other words, there should be no physical constructions which would impede sliding engagement of adjacent sections 12, e.g. 12A and 12B; 12B and 12C; etc.

The particular length of each section 12A-12E and the total quantity of sections 12 comprising each pole 10 can vary depending upon the overall total length required for the pole 10. It should be recognized that any combination of lengths and quantity may be used to provide the desired length and satisfy the intended uses of the pole 10.

The sections 12A-12E are constructed of any suitable material which provides the desired strength, color stability and dielectric properties. The preferred material is a reinforced high density electrical grade fiber glass laminate with which a skilled artisan would be familiar.

As seen in FIG. 1, adjacent sections 12, i.e. 12A and 12B, 12B and 12C, etc., are maintained in extended engagement by the particular locking assembly 14 associated therewith. To illustrate the cooperating engagement of these structures, the specific construction of representative sections 12A and 12B is described as illustrated in FIGS. 3, 4, 5, 8 and 9. It should be recognized, however, that a similar construction is utilized with respect to the engagement of the other adjacent sections 12B-12E illustrated in FIG. 1.

Referring to FIG. 8, the larger first section 12A includes adjacent a female end 20, defined by an opening 21, an aperture 22 therethrough in one surface of the non-circular form.

To prevent rotation and facilitate gripping of the outer periphery 24 of the section 12A by the user, the outer periphery 24 as well as an inner periphery 26 of section 12A is formed with the substantially same triangular cross-sectional shape.

To permit sliding engagement of the section 12B within the adjacent section 12A, the section 12B has a male end 28 which has an outer periphery 30 conforming in a close-fit relation to the inner periphery 26 of the female end 20. A typical clearance between an inner peripheral surface 26 and an outer peripheral surface 28 of each of the telescoping sections is in the range of 0.012 to 0.016 inches which is also sufficient to prevent entrapment of air. To accomplish locking engagement of the section 12B with the section 12A, the male end 28 includes an aperture 32 extending therethrough. The aperture 32 is positioned adjacent to a terminal end part of the male part 28 and dimensioned so as to permit alignment of the aperture 32 with the aperture 22 of the section 12A. Accordingly, the extended position of the section 12B, as illustrated in FIG. 1, is defined by the relative positions of the sections 12A and 12B when the apertures 22 and 32 are in registry.

To lock the male end 28 in engagement with the female end 20 and maintain the section 12B in the extended position, the locking assembly 14B is provided on the section 12B as seen in FIG. 8. The locking assembly 14B includes an end wall portion 34 and a mounting section 36 which are formed of a polymer or any other suitable material. The mounting section 36 is formed with an outer periphery 38 having a cross-sectional shape and outer dimension conforming in a close-fit relation to an inner peripheral surface 40 of the male end 28 so as to permit insertion of the mounting section 36 within the male end 28. To limit the extent of insertion of the mounting section 36 therein, the end wall portion 34 is dimensioned so as to form an annular flange 42 which extends radially outward so as to be flush with the outer periphery 30 of the mounting section 36.

The annular flange 42 abuts against an end face 44 of the male end 28 when the locking assembly 14B is fully inserted therein to close off the male end 28.

The locking assemblies 14B-14E are each secured inside the respective males end of each section 12B-12E, respectively, by any conventional and conveniently available means.

To lock the male end 28 with the female end 20 in the extended position, a spring biased button 54 seats within a pocket 56 formed within the locking assembly 14A. To engage the male end 28 with the female end 20 when the apertures 22 and 32 are in registry, the button 54 has an outer peripheral dimension and shape which is substantially identical to the peripheral dimensions and shape of the apertures 22 and 32 such that the button 54 extends therethrough and prevents relative movement of the adjacent sections 12A and 12B.

To maintain the button 54 in an extended locking position illustrated in FIG. 3, a spring 58 is retained between a spring seat 60 in the pocket 56 and an opposing spring seat 62 formed on the button 54. To keep the button 54 within the pocket 56 when the locking assembly 14 is secured within the male end 28, outwardly extending flanges 64 illustrated in FIG. 5 are provided on the button 54. The flanges 64 are stepped so as to contact the inner periphery 40 of the male end 28 when the button 54 is extended as seen in FIG. 3.

In the device shown in the aforementioned U.S. Pat. No. 5,593,196 which is incorporated herein by reference, it periodically occurs that the digit on the user's hand manually urging the button radially inwardly against the urging of the spring 58 would become pinched between the mutually adjacent axially oppositely facing edges of the apertures 22 and 32 when the sections 12A and 12 were moved axially relative to one another. If the user was wearing a glove at the time, the material of the glove would become snagged between the aforesaid mutually facing edges of the apertures in the respective sections 12A and 12B. In order to prevent the pinching from occurring, we have provided a pinch safety feature which includes the provision of an elastically compressible O-ring 70 having a preselected cross-sectional diameter in the pocket 56 and configured to rest on the bottom wall 71 of the pocket as shown in FIGS. 3-5. The cross-sectional diameter D (FIG. 8) of the O-ring 70 is preselected to engage the bottom surface 72 of the button 54 when the button is urged by the digit on the user's hand radially inwardly to the position where the upper surface 73 of the button becomes located just inside the inner surface 40 of the outer section 12A as shown in FIG. 4. The O-ring 70 serves to provide a tactile indication to the user of restriction to further movement of the button radially inwardly by the digit on the user's hand and, since the upper surface 73 of the button 70 is located just inside the inner surface 40, the resulting gap between the outer surface of the section 12B and the inner surface of the outer section 12A is much smaller than the user's finger to thereby prevent the digit on the user's hand from becoming pinched between the mutually adjacent axially oppositely facing edges of the apertures 22 and 32 when the adjacent sections are moved axially with respect to one another. To move the button 54 further radially inwardly from the position illustrated in FIG. 4 would require a much greater force than can be provided by the digit on the user's hand. In this particular embodiment, the O-ring 70 is made of an elastically compressible polymer, such as rubber or equivalent, having a resistance to compression that is tactilely noticeably greater than the resistance to compression of the spring 58.

Figure 9:
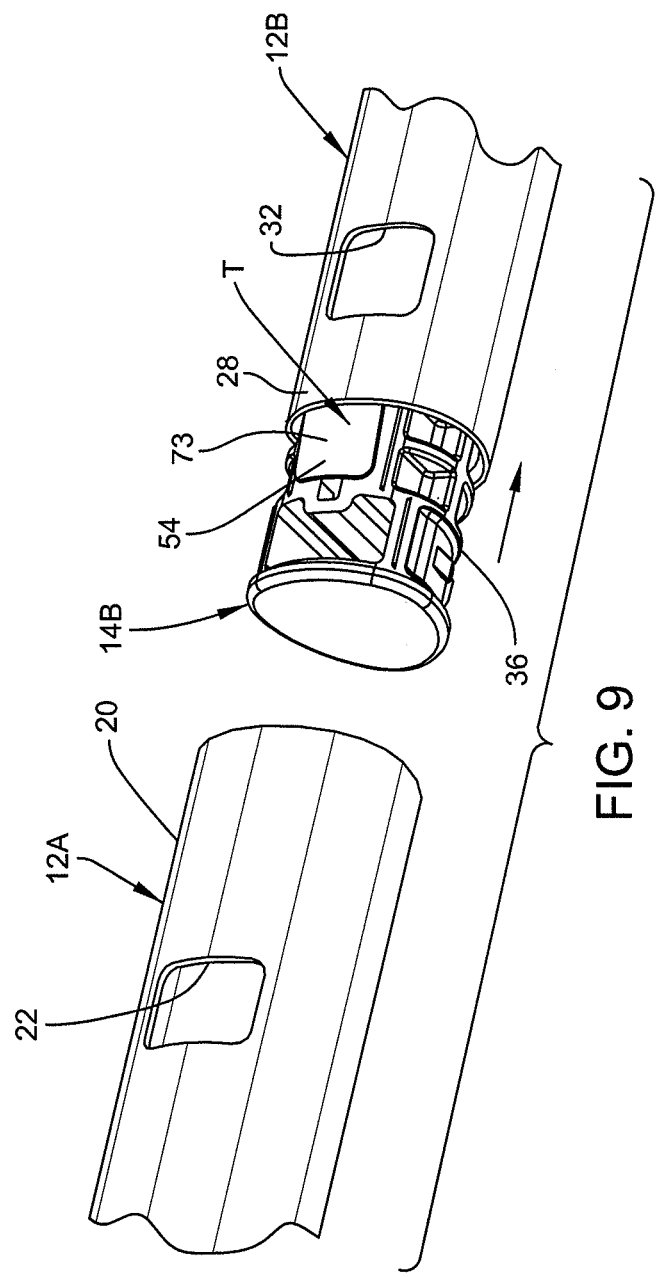
FIG. 9 is an exploded partial perspective view of the locking assembly being assembled into the inner tube section.

In order to assemble the locking assemblies 14, i.e., 14B-14E, into the respective sections 12B-12E, the upper surface 73 of the respective button 54 is required to be moved radially inwardly with the assistance of a tool schematically represented by the reference T in FIG. 9 or an excessive hand force against the combined resistance of the spring 58 and the elastically compressible O-ring 70 to just inside the outer periphery of the section into which it is being installed (illustrative example shown in FIGS. 5 and 9) so that the respective locking assembly can be slid along the axial path until the button becomes aligned with the respective aperture 32 at which time the button is urged radially outwardly through the aperture 32 by the resilience of the resilient members 58 and 70. Thereafter, to disengage the button 54 from the apertures 22 and 32 and permit removal and/or relative telescoping sliding of the male end 28 with respect to the female end 20, a user may actuate the button 54 to a depressed position where the user will note the tactile sensation of resistance provided by the O-ring 70. During sliding of section 12B, the button 54 remains in the depressed position either until the apertures 22 and 32 are in registry and the button 54 is biased upwardly by the spring 58 or until the section 12B is removed completely from section 12A.

It is to be understood that a second compression spring (not shown) can be used in place of the O-ring 70, such as providing the second spring inside (or outside) of the spring 58. Further, a dual rate spring could be used in place of the combined single rate spring 58 and O-ring 70. It is also understood that other forms of elastomers such as a short section of tubing could be used in place of the O-ring.

Although particular preferred embodiments of the invention have been disclosed in detail for illustrative purposes to demonstrate the improvement over known constructions, it will be recognized that variations or modifications of the disclosed apparatus of the invention, including the rearrangement of parts, lie within the scope of the present invention.

What is claimed is:

1. A telescoping pole for manipulating a tool from a position a selected distance away from a workpiece, said pole having an extremity with means for connecting the tool thereto and further comprising:
a tubular first section having a female end and a predetermined shape, said first section including a first aperture and an interior which defines an axial path and has an interior surface which is uniform about a periphery thereof;
a second section having a male end slidingly engaged within said interior of said first section through said female end, said second section having a second aperture and a predetermined shape corresponding to said shape of said first section and being slidable along said axial path; and
pinch safety locking means including a button configured for manual movement of said button by a digit on a user's hand within aligned said first and second apertures from a first position radially outside an outer periphery of said first section radially inwardly against a resistance provided by a first resilient member so that a top surface of said button becomes located at a second location just inside an inner surface of said first section whereat an end of said button remote from the top surface engages an elastically compressible stop having a high resistance to yielding to permit relative longitudinal movement between said first and second sections without the digit on the user's hand becoming pinched between said first and second sections, said pinch safety locking means being additionally configured to facilitate initial assembly inside said second section by movement of the top surface of said button by the use of an excessive force to a third position just inside an inner surface of said second section against a combined resistance of said first resilient member and said elastically compressible stop to permit relative movement between said pinch safety locking means and said second section and a sliding of said pinch safety locking means along said axial path to a position where said button is aligned with and received in said second aperture.

2. The telescoping pole according to claim 1, wherein said excessive force is defined by said elastically compressible stop having a resistance to yielding that is greater than a resistance to yielding of said first resilient member.

3. The telescoping pole according to claim 2, wherein said first resilient member is a compression spring.

4. The telescoping pole according to claim 2, wherein said elastically compressible stop is made of an elastically compressive material.

5. The telescoping pole according to claim 2, wherein said first resilient member is a compression spring and said elastically compressible stop is an O-ring made of an elastically compressive material.

6. The telescoping pole according to claim 5, wherein said tubular first section has a predetermined non-circular cross-sectional shape and an interior surface which is uniform about a periphery thereof and said second section has a predetermined non-circular cross-sectional shape corresponding to said shape of said first section to prevent rotation of said second section relative to said first section when engaged therein and being slidable along said axial path, said second section being free of any construction inhibiting removal from said first section upon disengagement of said locking means.

* * * * *